United States Patent
Machida et al.

(10) Patent No.: US 7,313,255 B2
(45) Date of Patent: Dec. 25, 2007

(54) SYSTEM AND METHOD FOR OPTICALLY DETECTING A CLICK EVENT

(75) Inventors: Akihiro Machida, Cupertino, CA (US); Izhak Baharav, San Jose, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 746 days.

(21) Appl. No.: 10/440,709

(22) Filed: May 19, 2003

(65) Prior Publication Data

US 2004/0234107 A1 Nov. 25, 2004

(51) Int. Cl.
*G06K 9/00* (2006.01)
*G06F 3/033* (2006.01)
*G06M 7/00* (2006.01)

(52) U.S. Cl. .............. 382/107; 345/163; 345/166; 250/221

(58) Field of Classification Search .............. 382/107, 382/124; 345/156, 165, 163, 166; 250/221; 356/445
See application file for complete search history.

(56) References Cited

U.S. PATENT DOCUMENTS

| | | | | |
|---|---|---|---|---|
| 5,355,148 | A * | 10/1994 | Anderson | 346/166 |
| 6,057,540 | A * | 5/2000 | Gordon et al. | 250/221 |
| 6,166,370 | A * | 12/2000 | Sayag | 250/221 |
| 6,320,177 | B1 * | 11/2001 | Sayag | 250/208.1 |
| 6,408,087 | B1 * | 6/2002 | Kramer | 382/124 |
| 6,501,846 | B1 * | 12/2002 | Dickinson et al. | 382/124 |
| 6,654,001 | B1 * | 11/2003 | Su | 345/156 |
| 6,677,929 | B2 * | 1/2004 | Gordon et al. | 345/156 |
| 6,707,027 | B2 * | 3/2004 | Liess et al. | 250/221 |
| 6,847,350 | B2 * | 1/2005 | Van Brocklin et al. | 345/157 |
| 6,937,226 | B2 * | 8/2005 | Sakurai et al. | 345/156 |
| 2003/0020004 | A1 * | 1/2003 | Reime | 250/214 SW |
| 2004/0046741 | A1 * | 3/2004 | Low et al. | 345/166 |

FOREIGN PATENT DOCUMENTS

| | | |
|---|---|---|
| EP | 0829 799 | 11/1993 |
| GB | 2373837 | 10/2002 |
| WO | WO 99/27485 | 6/1999 |
| WO | WO 01/59558 | 2/2001 |
| WO | WO 02/37411 A1 * | 5/2002 |
| WO | WO 03/102717 | 6/2003 |

OTHER PUBLICATIONS

Search Report Under Section 17 dated Sep. 28, 2004.

* cited by examiner

*Primary Examiner*—Andrew W. Johns
*Assistant Examiner*—Andrae Allison

(57) ABSTRACT

An imaging system captures a sequence of images representing finger lift-up and finger put-down motions over a sensing area and produces an image signal for use in detecting a click event. At least one light source illuminates a finger interface upon which a user places a finger (or thumb). Light reflected from the finger is captured by an image sensor as image data corresponding to the sequence of images. At least one image signal is produced in connection with or based on the image data. The image signal is used to detect a finger lift-up or finger put-down motion. A click, such as a single click, double click or triple click, is detected based on a combination of finger lift-up and finger put-down motions within a configurable time range.

26 Claims, 7 Drawing Sheets

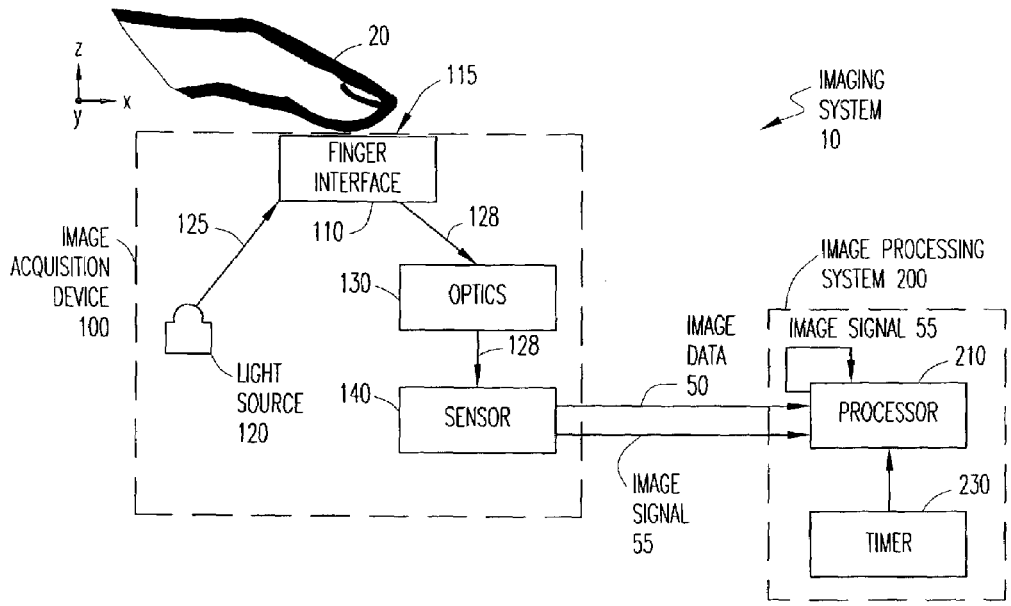
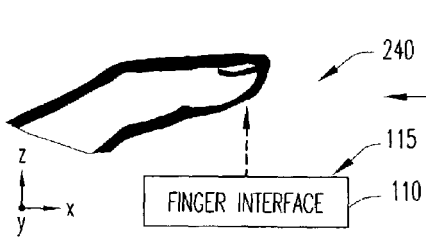 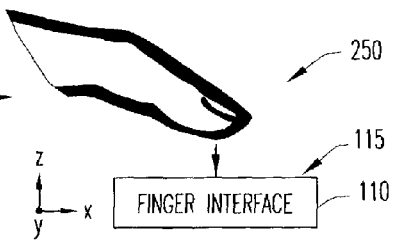
FIG. 2A   FIG. 2B
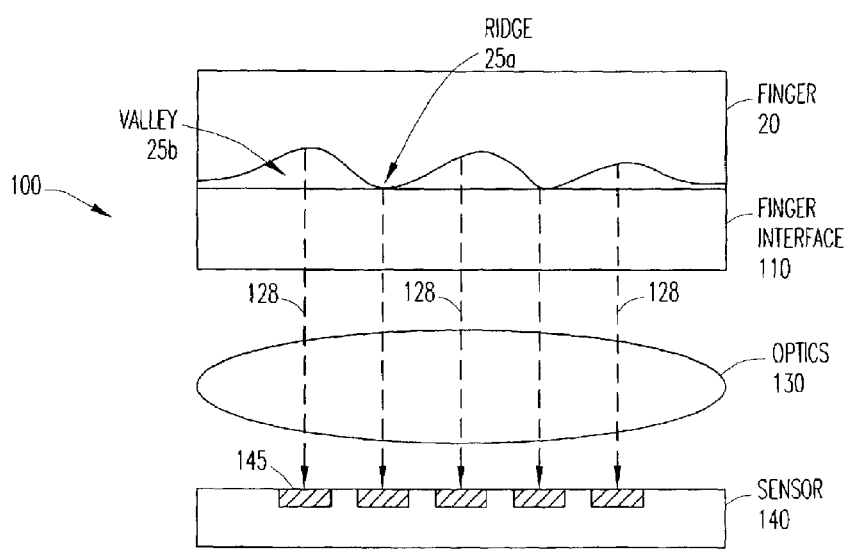
FIG. 3

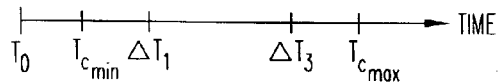
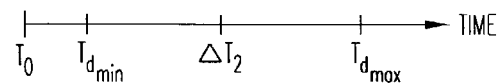
FIG. 5A
FIG. 5B
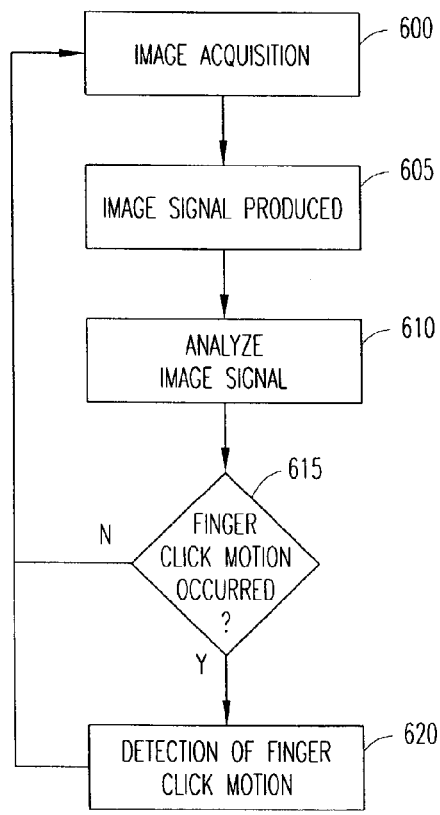
FIG. 6A
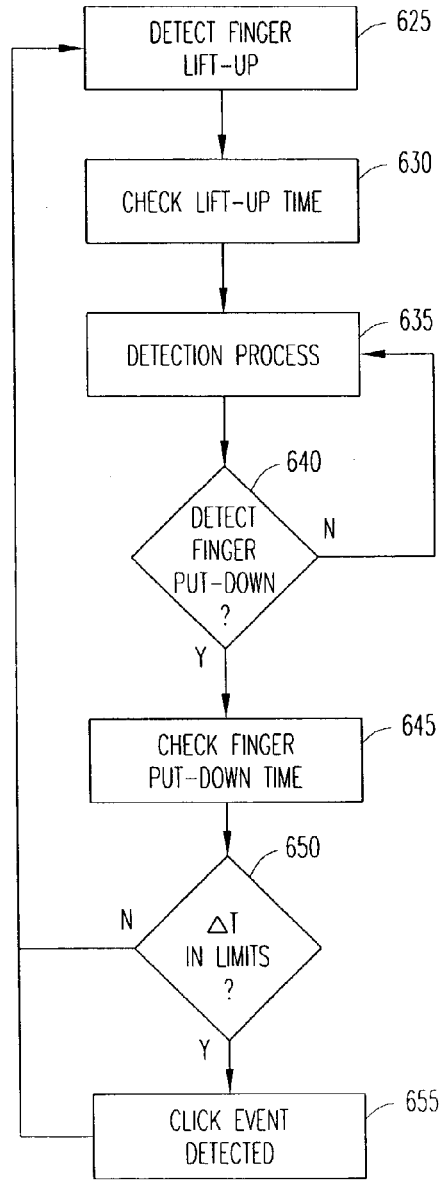
FIG. 6B

SYSTEM AND METHOD FOR OPTICALLY DETECTING A CLICK EVENT

BACKGROUND OF THE INVENTION

1. Technical Field of the Invention

The present invention relates generally to the field of image acquisition. More specifically, the present invention relates to systems and methods for obtaining and processing images of fingerprints for click detection purposes.

2. Description of Related Art

Many electronic devices, such as personal computers, laptop computers, wireless telephones and personal digital assistants (PDAs), provide a navigation mechanism for controlling a cursor or pointer on a screen. By far, the most popular navigation mechanism in PC usage is the mouse. Recently, optical mice have been developed that are able to navigate on nearly any arbitrary surface using a tracking algorithm that correlates sequential images in the direction of movement.

For example, U.S. Pat. No. 6,281,882, entitled PROXIMITY DETECTOR FOR A SEEING EYE MOUSE, which is hereby incorporated by reference in its entirety, describes an optical mouse that images the spatial features of a surface below the mouse and compares successive images to ascertain the direction and amount of movement. In addition, as described in U.S. Pat. No. 6,057,540, entitled MOUSELESS OPTICAL AND POSITION TRANSLATION TYPE SCREEN POINTER CONTROL FOR A COMPUTER SYSTEM, which is hereby incorporated by reference in its entirety, an optical finger navigation device has also been developed that detects motion of the finger and translates the finger motion into corresponding motion of the cursor or pointer on the screen.

However, the optical mice available on the market today still require the use of buttons or other electromechanical selection devices to access applications provided by the associated electronic devices. For example, typically, the user positions the screen pointer or cursor at a desired location on the screen using the navigation mechanism provided by the mouse and then "clicks" or "double clicks" to access the application highlighted or pointed to by the cursor. With the increasing trend towards miniaturization in the design of cell phones, laptop computers, personal digital assistants, electronic mice and other electronic devices, providing the space for a separate selection button on the surface of the electronic device may not be acceptable. Therefore, what is needed is an optical mechanism for detecting a click event that minimizes the amount of space required on small and/or portable electronic devices.

SUMMARY OF THE INVENTION

Embodiments of the present invention provide an image acquisition device for capturing an image of a human finger within a sensing area and producing an image signal associated with the image for use in detecting a finger click motion, such as a finger lift-up motion or a finger put-down motion. A light source illuminates a finger interface upon which a user places a portion of a finger. Light reflected from the finger is captured by an optical sensor as image data corresponding to the image. At least one image signal is produced in connection with the image data. The image signal is used to detect a finger click motion. Combinations of finger click motions are used to detect click events.

In one embodiment, the image signal is a tracking quality signal indicative of the reliability of navigation information identifying the magnitude and direction of movement of the finger. In another embodiment, the image signal is a shutter speed signal corresponding to the shutter speed used to capture the image. In a further embodiment, the image signal is a unidirectionality signal signifying the correspondence between the image and a surface pattern indicator.

Further embodiments provide an imaging system having an image processing system for receiving the image signal and determining whether a finger click motion, such as a finger lift-up or finger put-down motion, has occurred. In addition, the image processing system is configured to detect a click event, such as a single click, double click or triple click, based on a combination of finger lift-up and finger put-down motions. For example, in one embodiment, a single click event is detected upon the occurrence of a finger lift-up motion, followed by a finger put-down motion, where the finger lift-up motion and finger put-down motion are separated in time within a configurable time range.

Additional embodiments enable the optical click detection mechanism to be utilized in conjunction with an optical finger navigation mechanism, in which the image data is processed using a tracking algorithm capable of correlating sequential images to ascertain navigation information indicating the magnitude and direction of movement of the finger. Furthermore, the optical click detection method can be utilized in conjunction with other optical applications, such as an optical finger recognition mechanism or an optical stylus mechanism.

Using an optical mechanism to detect click events reduces the size and cost for implementing application selection capabilities on an electronic device. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 1 is a block diagram illustrating an imaging system having an image acquisition system and an image processing system capable of detecting a click event;

FIGS. 2A and 2B are pictorial representations of a finger lift-up motion and a finger put-down motion, in accordance with embodiments of the invention;

FIG. 3 is a simplified and magnified cross-sectional view of the main components of the image acquisition device, in accordance with embodiments of the invention;

FIGS. 5A and 5B are time lines illustrating the detection of single-click and double-click events;

FIG. 6A is a flow chart illustrating an exemplary process for detecting a finger click motion;

FIG. 6B is a flow chart illustrating an exemplary process for detecting a click event;

DETAILED DESCRIPTION OF EXEMPLARY EMBODIMENTS

Figure 4A:
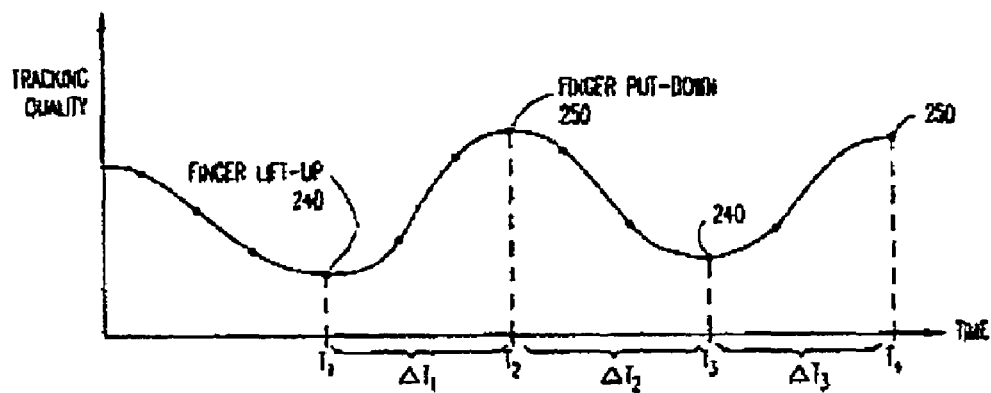
FIGS. 4A-4C graphically illustrate various image signals utilized to detect click events.

The numerous innovative teachings of the present application will be described with particular reference to exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

FIG. 1 illustrates an exemplary imaging system 10 that can be used with the present invention to detect a finger click motion, which will be described in more detail below in connection with FIGS. 2A and 2B. For example, a finger click motion can be a finger lift-up motion or a finger put-down motion. Combinations of finger click motions can be detected to indicate a click event, such as a single click, double click, triple click or any other multiple click. A click event is analogous to the operation of selector keys on a conventional mouse. However, during a click event, no actual "click" occurs.

The imaging system 10 includes an image acquisition device 100 for capturing image data 50 representing an image of a human finger and an image processing system 200 for processing the image data 50 to detect a click event. As used below, the term "finger" includes any human body part (e.g., finger, thumb, toe, tongue, etc.).

The image acquisition device 100 includes a finger interface 110 having a top surface 115 upon which a user can press and move a finger 20. The top surface 115 may be flat, or preferably, have a slight curvature. For example, a convex curvature aids in enlarging the sensing area of the top surface 115. The sensing area is the portion of the top surface 115 that is in focus for capturing an image of the finger 20 pressed against the top surface 115. In preferred embodiments, the sensing area includes the entire top surface 115 of the finger interface 110. The finger interface 110 may be formed of glass or other wear resistant material that is transparent to light emitted from a light source 120 illuminating the top surface 115 of the finger interface 110.

The finger interface 110 is of a size sufficient to enable the device 100 to capture an image of at least a portion of the tip of the finger. In one embodiment, the finger interface 110 is elongated in shape to provide a sensing area less than the area of the tip of a human finger in at least one dimension. The area of the tip of the human finger is defined as the conventional 9×12 mm sensing area. Using the axes shown in FIG. 1, in one embodiment, the finger interface 110 is elongated in the y-direction. As an example, the finger interface 110 can be approximately 7-9 mm in the y-direction and 1 mm in the x-direction. In other embodiments, the finger interface 110 may be larger in the x-direction, up to 2 mm in some areas, to enable better performance at the cost of larger area.

Figure 9A:
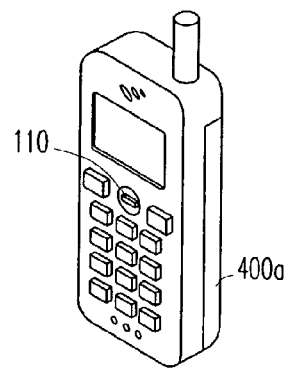
FIGS. 9A-9C illustrate various electronic devices implementing the imaging system of the present invention.

As shown in FIG. 1, the user's finger 20 is positioned on the finger interface 110 with the length of the finger 20 from the finger tip to the base of the finger 20 oriented approximately in the x-direction and the width of the finger 20 across the sides of the finger 20 oriented approximately in the y-direction. Therefore, the length of the finger 20 is shown orthogonal to the elongated direction of the finger interface 110 to capture images of a portion of the tip of the finger 20 across the width of the finger 20. However, it should be understood that in other embodiments, the length of the finger 20 may have any orientation with respect to the elongated direction of the finger interface 110. For example, the length of the finger 20 may be parallel to the elongated direction of the finger interface 110. An example of an electronic device incorporating an elongated finger interface 110 is shown in FIG. 9A.

Figure 9B:
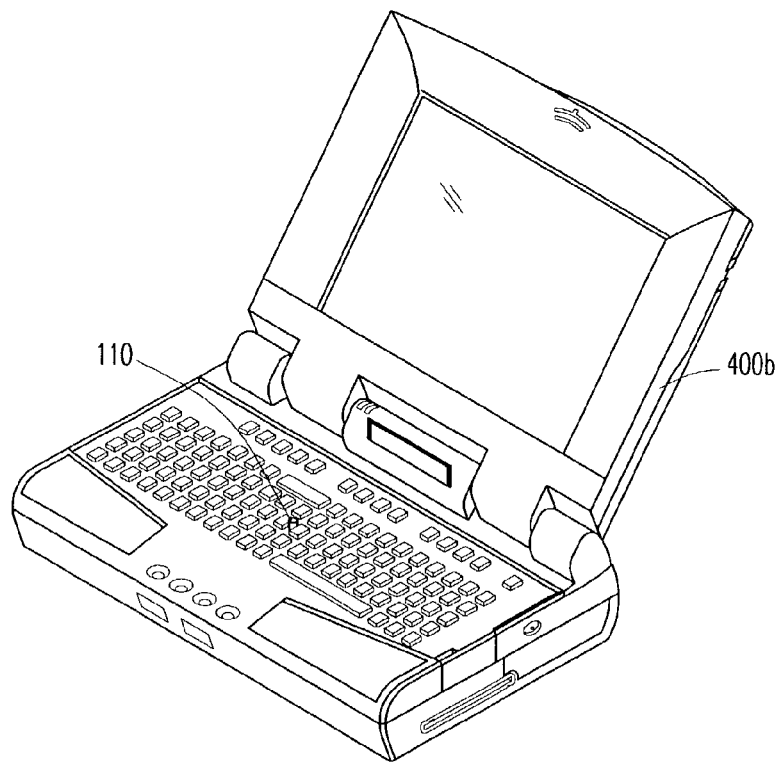
Figure 9C:
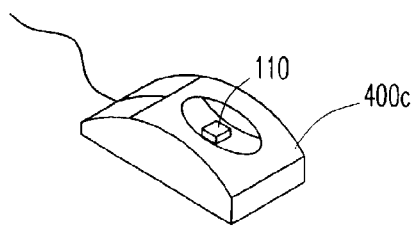

In other embodiments, the finger interface 110 can be an area interface (as shown in FIG. 9C) to capture a complete image of the finger without requiring movement of the finger across the interface 110. In still further embodiments, the finger interface 110 can be an end of a rod lens of the type shown and described in U.S. Pat. No. 6,057,540. An example of an electronic device incorporating a rod lens is shown in FIG. 9B.

The light source 120 can be any suitable source of electromagnetic radiation (light 125). By way of example, but not limitation, the light source 120 can be a single light emitting diode (LED), multiple LEDs arranged to illuminate different portions of the finger interface surface 115 or an array of LEDs designed to emit light 125 at a desired average intensity. The wavelength of light 125 emitted from the light source 120 is selected to maximize reflection of the light 125 from human skin and enable the reflected light 128 to be distinguished from unwanted light signals. In addition, the wavelength of the light 125 can be chosen based on user or manufacturer preferences. For example, some manufacturers may prefer blue light to red light in certain applications. The light source 120 can be in an "on state" in a continuous mode with either a steady or variable amount of illumination or in a duty-cycle mode, where the light source 120 is pulsed on and off to control the exposure by servoing the average amount of light. The intensity of illumination can be controlled using any known technique.

Illumination optics (not shown) can also be used to direct the light 125 towards the finger interface 110 at the desired angle of incidence. For example, illumination optics could consist of LED dome lenses or a light pipe that channels the light 125 towards the finger interface 110 with a minimal amount of light loss. It is known in the art that the preferred angle of incidence for illuminating opaque material is a grazing angle within the range of five to twenty degrees. An angle of incidence in this range provides a high signal-to-noise ratio of image data representing inherent structural features of the object being imaged. However, due to the transparency of skin, such oblique angles are not necessary for adequately capturing image data 50 representing an image of the user's finger 20. Therefore, the selection of the angle of incidence is largely dependent upon the design of the image acquisition device 100, such as the number and type of LEDs used, the thickness of the image acquisition device 100 in the z-direction and the optics (illumination and image transfer) employed. In addition, in other embodiments, depending on the angle of incidence, the light 125 may be directed to the surface 115 of the finger interface 110 using a total internal reflection (TIR) mechanism or a reflected light mechanism.

When the tip of a finger 20 is pressed against the top surface 115 of the finger interface 110, ridges and valleys in the skin, referred to collectively as micro texture features, are visible in the plane of the top surface 115. Image transfer optics 130 directs light 128 reflected from those micro texture features onto an array of photo detectors that is part of an optical image sensor 140, which can be a CCD (Charge Coupled Device), a CMOS—APS (Complimentary Metal Oxide Semiconductor—Active Pixel Sensor) or any other type of optical sensor known in the art. Optical image sensors 140 are preferred over thermal or capacitive image sensors due to the magnification/demagnification mechanisms that can be used with optical image sensors to reduce the silicon area. Thermal and capacitive image sensors typically require the silicon area to be equivalent in size to the sensing area. In addition, capacitive image sensors might be susceptible to electrostatic discharge, which can decrease the signal-to-noise ratio, and thus degrade the image.

The optical image sensor 140 acquires an image of the micro texture features in the form of image data 50 representing the intensity of the reflected light 128 measured at each photo detector. Each photo detector captures a picture element (pixel) of the image, and all pixels are combined to form the complete image. The photo detectors can be, for example, photodiodes or phototransistors arranged in an array of a shape corresponding to the shape of the finger interface 110. For example, if the finger interface 110 is elongated in the y-direction, the sensor 140 can also be elongated in the y-direction. The size of the elongated array is dependent upon the magnification of the optics. For example, in one embodiment, the magnification of the optics is less than unity in a 1:3 ratio. Therefore, if the size of the sensing area (top surface 115) is 9 mm×1 mm, the size of the sensor 140 need only be 3 mm×0.3 mm. Since the features on the fingertip 20 are large enough to view unaided with the human eye, the sensor 140 area can be reduced using a magnification less than unity to reduce the cost of the sensor 140 and also to reduce the size of the image acquisition device 100. However, it should be understood that other magnifications less than unity, near unity or above unity can also be used, depending on the size constraints of the image acquisition device 100 and the manufacturer's preferences.

Each photo detector has a photo sensitive region between 5 and 60 μm square, with the spacing between the photo detectors designed to achieve the desired spatial resolution of the sensor 140. For example, on a 3 mm×0.3 mm pixel area, to achieve a resolution of 400 dpi in the finger sensing area of 9 mm×1 mm requires 144×16 photo detectors of a size of 21 μm by 21 μm. Regardless of the desired resolution, the size of the photo detectors and the spacing between the photo detectors are configured to provide at least one (preferably more than one) photo detector per image micro texture feature, and the overall size of the photo detector array is made large enough to receive an image having several micro texture features.

The image sensor 140 provides image data 50 (e.g., raw pixel values) to a processor 210 within the image processing system 200 capable of processing the image data 50 and detecting a click event. The processor 210 can be any microprocessor, microcontroller or other processing device capable of processing the image data 50 and detecting a click event and can also be embedded in the same chip as the image sensor 140. The image sensor 140 can further provide an image signal 55 to the processor 210 for use in detecting a click event. In other embodiments, the image data 50 can be processed by the processor 210 to determine the image signal 55 used to detect a click event.

In one embodiment, the image signal 55 can be a tracking quality signal indicative of the reliability of navigation information identifying the magnitude and direction of movement of the finger. In another embodiment, the image signal 55 can be a shutter speed signal corresponding to the shutter speed used to capture the image. In a further embodiment, the image signal 55 can be a unidirectionality signal signifying the correspondence between the image and a surface pattern indicator. Each of these image signals will be described in more detail below in connection with FIGS. 4A-4C. However, it should be understood that other image signals can be used instead of, or in addition to, the image signals described in FIGS. 4A-4C.

The processor 210 uses the image signal 55 to detect a finger click motion, such as a finger lift-up motion or finger put-down motion. Based on a combination of finger lift-up and finger put-down motions within a configurable time range monitored by a timer 230 or by predetermined and stored configurable time limits, the processor 210 can detect click events, such as a single click, double click or triple click. For example, in one embodiment, a single click event is detected upon the occurrence of a finger lift-up motion, followed by a finger put-down motion, where the finger lift-up motion and finger put-down motion are separated in time within a configurable time range. In another embodiment, a double click event is detected upon the occurrence of two single click events separated in time within a configurable time range.

The imaging system 10 can be included within a single electronic device or within multiple electronic devices. For example, the image acquisition device 100 can be implemented in a remote electronic device, such as a mouse, while the image processing system 200 can be implemented in a personal computer having an interface to the mouse. As another example, the image acquisition device 100 and image processing system 200 can both be implemented in small and/or portable electronic devices, such as a cell phone, laptop computer or PDA. It should be understood that if the imaging system 10 is implemented entirely in a single electronic device, the image processing system 200 can be included within the image acquisition device 100 or connected to the image acquisition device 100.

The image acquisition device 100 has a thickness in the z-direction dependent upon the requirements of the electronic device. For example, many electronic devices dictate a thickness of less than 5 mm. In order to build an image acquisition device 100 within the thickness specifications of the electronic device, various techniques for folding the optical path of the light or reducing the size of the optics can be used.

Referring now to FIGS. 2A and 2B, there is illustrated exemplary finger click motions. FIG. 2A illustrates a finger lift-up motion and FIG. 2B illustrates a finger put-down motion. As shown in FIG. 2A, the user's finger is shown moving away from the top surface 115 of the finger interface 110 in the z-direction. This movement is referred to as a finger lift-up motion 240. In FIG. 2B, the user's finger is shown moving towards the top surface 115 of the finger interface 110 in the z-direction. This movement is referred to as a finger put-down motion 250.

Referring now to FIG. 3, detection of finger lift-up and finger put-down motions is based, in part, on the visibility of micro texture features in the image taken by the image acquisition device 100. Such micro texture features include ridges 25a and valleys 25b in the portion of the tip of the finger being imaged. Light 128 reflected from the finger 20 and passed through the finger interface 110 is focused by optics 130 onto an imaging sensor 140 having an array of photo detectors 145 thereon. The optics 130 focuses light 128 reflected from a portion of a fingerprint (e.g., either a fingerprint ridge 25a or a fingerprint valley 25b) onto corresponding photo detectors 145 to produce image data representative of the fingerprint 25 visible within the sensing area of the finger interface 110.

Figure 4B:
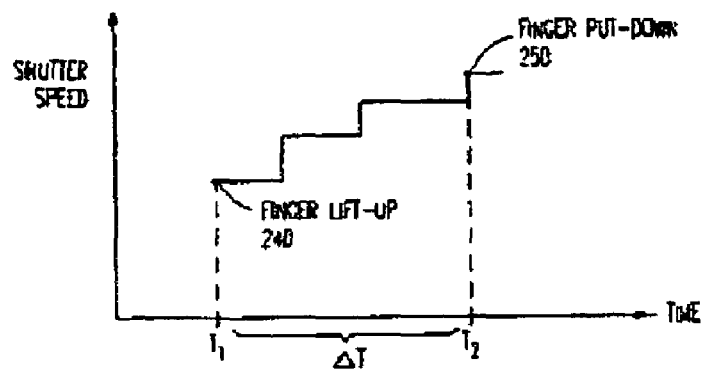
Figure 4C:
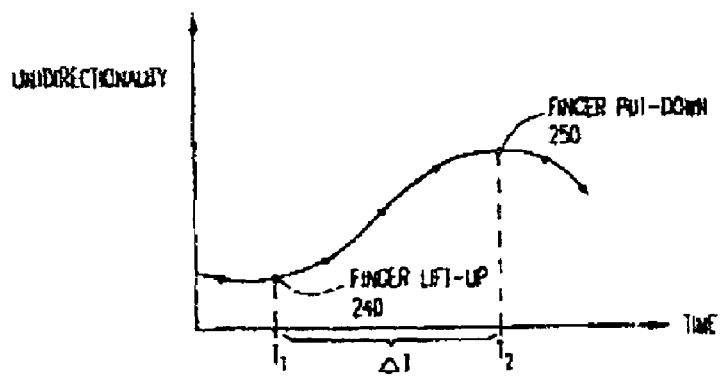

Referring now to FIGS. 4A-4C, from the image data and other information associated with the image data, one or more image signals can be produced for use in detecting a finger click motion, such as a finger lift-up motion or finger put-down motion. By monitoring the change in the image signals, finger lift-up and finger put-down motions can be detected. In order to determine whether a change in the value of a particular image signal indicates that a finger click motion has occurred, the typical value and typical change associated with the image signal should be considered. The typical values and changes are application specific and may depend in part on the internal illumination pattern of the image acquisition device, the expected reflectance from the user finger, the sensitivity required and other variables. Therefore, the signal changes representing events in FIGS. 4A-4C are shown for illustrative purposes only, and may not accurately depict the amount of change or the values necessary for finger click motion detection.

In one embodiment, as shown in FIG. 4A, one of the image signals can be a tracking quality signal that is used to measure the quality of the image as it relates to the ability of the system to track motion of the finger across the finger interface. For example, the tracking quality is considered poor or low when the finger is not in focus due to the finger not properly touching the surface or when the motion of the finger is in the direction of the ridges.

In FIG. 4A, the tracking quality signal is plotted over time with each new image taken. By comparing the value of the current tracking quality signal with the value of the previous tracking quality signal, finger lift-up and finger put-down motions can be detected. For example, if the value of the tracking quality signal at a time ($T_1$) is less than the immediately preceding tracking quality signal value, a finger lift-up motion 240 can be detected. The decline in the tracking quality of the image signifies, in many cases, that the user's finger has moved away from the finger interface, and therefore, the focus of the image is deteriorating. Likewise, if the value of the tracking quality signal at a time ($T_2$) is greater than the immediately preceding tracking quality signal value, a finger put-down motion 250 can be detected.

It should be understood that the detection of finger click motions can be made using other or additional mathematical or analytical processes. For example, finger click motions can be detected using threshold tracking quality signal values. If the current tracking quality signal value changes to less than a first threshold quality tracking signal value, a finger lift-up motion can be detected, and if the current tracking quality signal value changes to greater than a second threshold quality tracking signal value, a finger put-down motion can be detected. The threshold tracking quality signal values can also be used in conjunction with a simple comparison between the current tracking quality signal value and the immediately preceding tracking quality signal value. Using threshold tracking quality signal values may reduce the number of erroneous finger click motion detections and/or establish a more accurate time period for detecting click events. As another example, finger click motions can be detected based on a comparison of the current tracking quality signal value with both preceding and subsequent tracking quality signal values.

The detection of either a finger lift-up motion 240 or a finger put-down motion 250 by itself does not indicate a click event. It is the combination of a finger lift-up motion 240 followed by a finger put-down motion 250 within a configurable time period that signifies a click event has occurred. Therefore, the difference in time ($\Delta T_1$) between the detection of a finger lift-up motion 240 at time $T_1$ and the detection of a finger put-down motion 250 at time $T_2$ is indicative of whether a click event has occurred. Likewise, the difference in time (e.g., $\Delta T_3$) between the detection of another finger lift-up motion 240 (e.g., at time $T_3$) and the detection of another finger put-down motion 250 (e.g., at time $T_4$) is indicative of whether another click event has occurred.

A time line plotting the difference in time ($\Delta T_1$ and $\Delta T_3$) between detected finger lift-up motions and finger put-down motions is shown in FIG. 5A. The time line is initiated upon the detection of a finger lift-up motion at time $T_0$. The configurable time period within which a click event can be detected is shown as between Tc_min and Tc_max. Click events typically have a short time between finger lift-up and finger put-down. As with conventional mice, this time period can be set for different users. However, a typical time period would range between Tc_min=0.1 sec minimum to Tc_max=0.3 sec maximum. If the difference in time between the detected finger lift-up motion and the detected finger put-down motion is outside of the configurable time period, the detection of a finger lift-up motion may simply indicate the end of session, and therefore, no click event would be detected.

Referring now to FIG. 5B, the decision as to whether a single click has occurred or a multiple (double, triple, etc.) click has occurred can also be made by monitoring the time period between sequential click events, denoted as Td_min and Td_max. The time line in FIG. 5B is initialized at the detected completion of a first click event (i.e., upon the detection of a finger put-down motion of a click event) at time $T_0$. As with the single click time period, the multiple click time period can be set differently for different users and different applications. Therefore, as shown in FIG. 4A, if the difference in time ($\Delta T_2$) between the detected end of a first click event ($T_2$) and the detected beginning of a second click event ($T_3$) is between Td_min and Td_max, a double click is detected. In other embodiments, the time difference used to detect a multiple click event can be measured from the detected beginning of a first click event to the detected beginning or end of a second click event or from the detected end of a first click event to the detected end of a second click event, depending on the application. Similar time periods can be used to detect triple or higher click events.

Referring again to FIGS. 4B and 4C, image signals other than the tracking quality signal can be used to detect finger lift-up and finger put-down motions. For example, as shown in FIG. 4B, the image signal can be a shutter speed signal that specifies the shutter speed used to capture the image. The shutter speed refers to a time period within which the sensor detects light before reading out the pixel values. As the shutter speed increases, the detection time decreases. The sensor controls the shutter speed to produce a wide dynamic range image. An inappropriate shutter speed results in an image that is either too dark or too bright, with a limited dynamic range. The shutter speed signal value changes according to the skin-color of the finger inspected, the background illumination level and the placement of the finger. Thus, the shutter speed signal will change depending on whether the finger is in contact with the finger interface.

By comparing the value of the current shutter speed signal with the value of the previous shutter speed signal, or using other mathematical or analytical processes, as described above in connection with FIG. 4A, finger lift-up and finger put-down motions can be detected. For example, if the value of the shutter speed signal at a time ($T_1$) is less than the immediately preceding shutter speed signal value (not shown), a finger lift-up motion 240 can be detected. The decrease in the shutter speed signal signifies, in many cases, that the user's finger has moved away from the finger interface, and therefore, the level of light reflected by the user's finger is decreasing. Likewise, if the value of the shutter speed signal at a time ($T_2$) is greater than the immediately preceding shutter speed signal value (at time $T_1$), a finger put-down motion 250 can be detected. Brighter images require faster shutter speeds to reduce the detection time.

As shown in FIG. 4C, another image signal that can be used to detect a finger lift-up or finger put-down motion is a unidirectionality signal that measures the correspondence between an image and a surface pattern indicator. A fingerprint typically consists of many ridges oriented in the same direction. Although a swirl in a fingerprint is typically present near the base of the finger tip, the top portion of the finger tip near the nail outgrowth is commonly used for tapping purposes. Therefore, the area of the finger within the sensing area for tapping applications has mainly lateral ridges. Thus, the unidirectionality signal measures the visibility of such lateral ridges (the surface pattern indicator) in an image.

By comparing the value of the current unidirectionality signal with the value of the previous unidirectionality signal, or using other mathematical or analytical processes, as described above in connection with FIG. 4A, finger lift-up and finger put-down motions can be detected. For example, if the value of the unidirectionality signal at a time ($T_1$) is less than the immediately preceding unidirectionality signal value, a finger lift-up motion 240 can be detected. The decrease in the unidirectionality signal signifies, in many cases, that the user's finger has moved away from the finger interface, and therefore, the lateral ridges in the fingerprint are less visible. Likewise, if the value of the unidirectionality signal at a time ($T_2$) is greater than the immediately preceding unidirectionality signal value, a finger put-down motion 250 can be detected. The increase in the unidirectionality signal corresponds to the lateral ridges in the fingerprint coming into focus. The following tables correlates the detection of finger click motions (finger lift-up and put-down) and click events with the value of various image signals.

TABLE 1

| | | Signal Used | | |
|---|---|---|---|---|
| | | Shutter Speed | Tracking Quality | Unidirectionality |
| Finger Click Motion | Finger put-down | Shutter time becomes faster | Tracking quality improves | Surface unidirectionality increases |
| | Finger lift-up | Shutter time becomes slower | Tracking quality deteriorates | Surface unidirectionality decreases |

TABLE 2

| Click event | Finger Events |
|---|---|
| Single Click | Finger lift-up motion followed by a finger put-down motion, with time spacing in the range Tc_min to Tc_max |
| Double Click | Two single click events, separated in time within the range Td_min and Td_max |
| Triple Click | Three single click events, separated in time within the range Td_min and Td_max |

Turning now to FIG. 6A, there is illustrated an exemplary process 680 for detecting a finger click motion. Upon acquisition of an image (block 600), a current image signal associated with the image is produced (block 605). The current image signal is analyzed (block 610) to determine whether a finger click motion has occurred (block 615), either a finger lift-up motion or a finger put-down motion. If a finger click motion has occurred, detection of the finger click motion is noted (block 620). If no finger click motion is detected, subsequent image(s) are acquired (block 600) and the process is repeated until a finger click motion is detected.

Turning now to FIG. 6B, there is illustrated an exemplary process 680 for detecting a click event. After the detection of a finger lift-up motion (block 625), as described above in FIG. 6A, a finger lift-up time is checked (block 630), and the finger click motion detection process shown in FIG. 6A is repeated (block 635) until the detection of a finger put-down motion. If a finger put-down motion is detected (block 640), a finger put-down time is checked (block 645), and compared with the finger lift-up time. If the difference between the finger put-down time and the finger lift-up time is within a predetermined configurable time limit (block 650), a click event is detected (block 655). Otherwise, the process is repeated when a subsequent finger lift-up motion is detected (block 625).

It should be understood that processes in addition to or instead of the processes shown in FIG. 6B can be used to detect click events. For example, a timer can be used to monitor the time between the detection of finger lift-up and finger put-down motions, and the timer value or the expiration or non-expiration of the timer can be indicative of whether a click event has occurred.

Figure 6C:
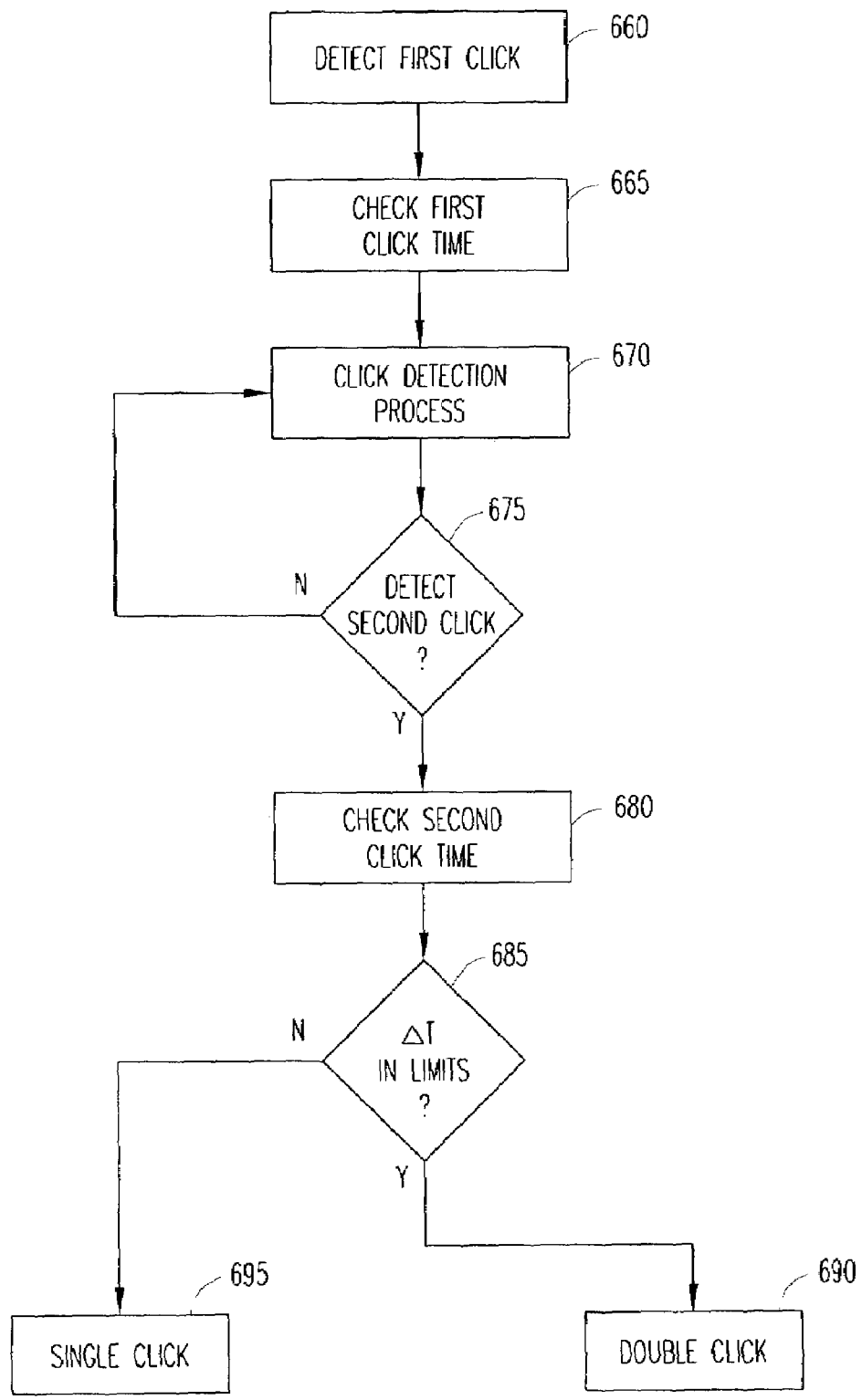
FIG. 6C is a flow chart illustrating an exemplary process for detecting a single-click and a double-click event.

FIG. 6C illustrates an exemplary process for detecting multiple clicks. After the detection of a click event (block 660), as described above in FIG. 6B, a first click time is checked (block 665), and the click detection process shown in FIG. 6B is repeated (block 670) until the detection of a second click event. If a second click event is detected (block 675), a second click time is checked (block 680), and compared with the first click time. If the difference between the second click time and the first click time is within a predetermined configurable time limit (block 685), a double click event is detected (block 690). Otherwise, a single click event is detected (block 695).

It should be understood that processes in addition to or instead of the processes shown in FIG. 6C can be used to detect multiple click events. For example, a timer can be used to monitor the time between the detection of a first click event and subsequent click events, and the timer value or the expiration or non-expiration of the timer can be indicative of whether a multiple click event has occurred.

Figure 7:
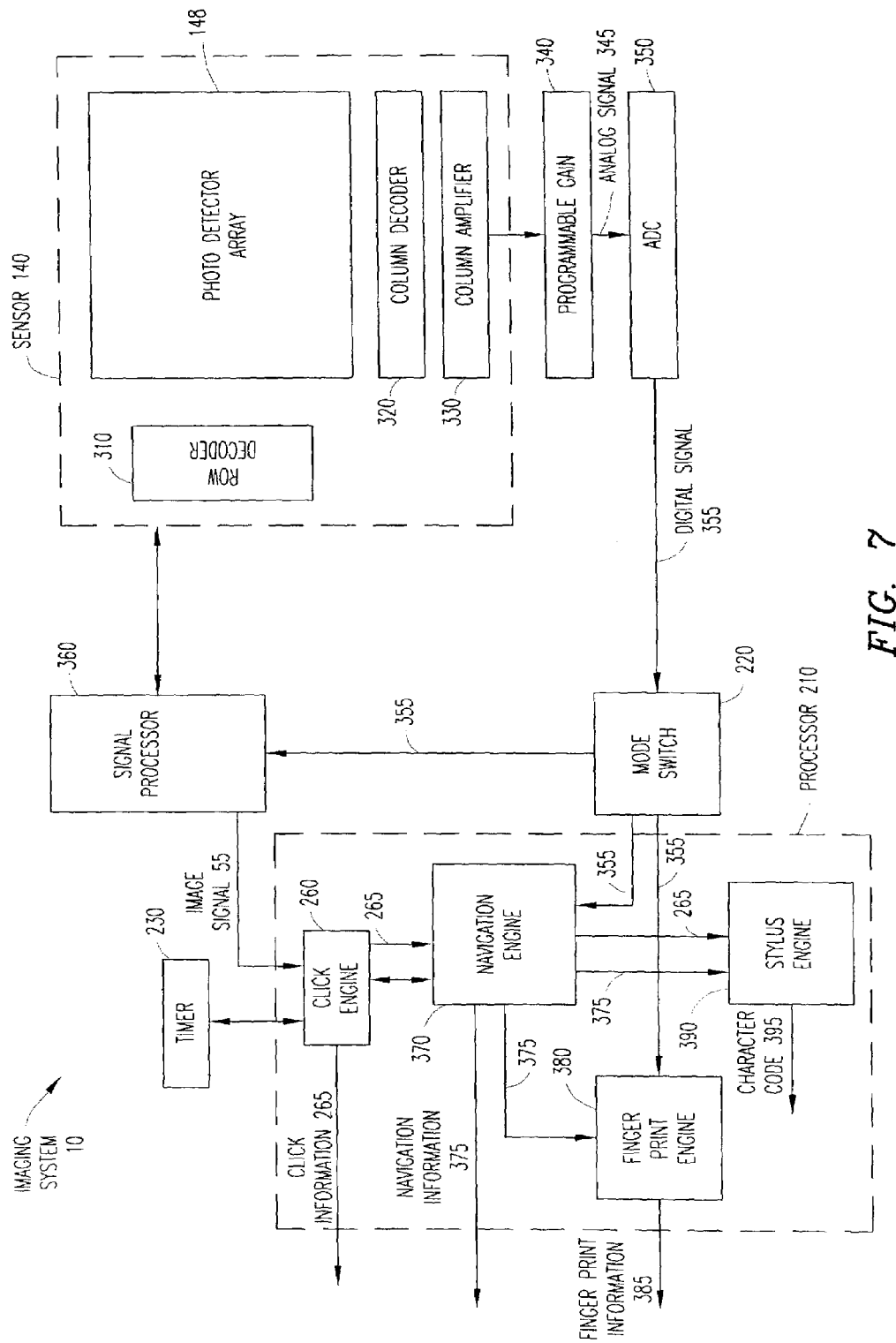
FIG. 7 is a block diagram illustrating exemplary hardware and processing components of the imaging system of the present invention.

FIG. 7 is a block diagram illustrating exemplary hardware and processing components of the imaging system 10 of the present invention. The imaging system 10 includes a sensor 140 having a photo detector array 148 for capturing an image projected thereon and for generating an analog signal 345 representative thereof. A row decoder 310 and column decoder 320 select the rows and columns of the photo detector array 148 for reading the analog signal 345 representing the pixel values and resetting the photo detectors. A column amplifier 330 amplifies the analog signal 345 and provides the analog signal 345 to a programmable gain 340 before converting the analog signal 345 to a corresponding digital signal 355 by an analog-to-digital converter (ADC) 350. The ADC 350 can be a six-bit, eight-bit or ten-bit ADC operable at a rate of between 25 frames/sec and 500 frames/sec.

The imaging system 10 further includes a mode switch 220 for selecting an appropriate mode for the processor 210 to process the digital signal 355. The click detection process can be used in conjunction with the selected mode. For example, the selected mode could be a finger navigation mode, in which finger movement controls the position of a cursor on a screen, or a stylus mode, in which finger strokes are used to represent written letters, numbers, punctuation marks and other written forms of communication in a convenient and efficient manner. In addition, the imaging system can further operate in various other modes that do not utilize the click process, such as a finger recognition mode, in which a captured image of a fingerprint is compared against a stored image of a fingerprint to authenticate a user.

For example, in finger navigation mode, mode switch 220 supplies the digital signal 355 to a navigation engine 370 to determine navigation information 375 indicating the direction and amount of movement of a current image as compared to a previous image. A number of different mechanisms can be used to determine the navigation information for use during finger navigation mode, finger recognition mode and stylus mode.

For example, as described in U.S. Pat. No. 6,172,354, entitled OPERATOR INPUT DEVICE, which is hereby incorporated by reference in its entirety, movement is detected by cross correlating a pattern in a sample area of a previous image with a pattern for the entire viewing area of a current image. Circular harmonics are used to determine movement of the current image compared with the previous image to provide rotationally invariant navigation information. Another method for determining navigation information is described in U.S. Pat. No. 6,195,475, entitled NAVIGATION SYSTEM FOR HANDHELD SCANNER, which is hereby incorporated by reference in its entirety. U.S. Pat. No. 6,195,475 models the correlation surface of correlation data representing a relationship between a sample frame and a reference frame as a general two-dimensional Taylor series expansion to determine the displacement of a reference feature contained in both the reference frame and the sample frame. A further navigation mechanism is taught in U.S. Pat. No. 5,578,813, entitled FREEHAND IMAGE SCANNING DEVICE WHICH COMPENSATES FOR NON-LINEAR MOVEMENT, which is hereby incorporated by reference in its entirety. The navigation mechanism described in U.S. Pat. No. 5,578,813 correlates successive frames of image data by comparing the positions of features within the successive frames.

The navigation engine 370 can interface with a click engine 260 to detect click events during finger navigation mode. A signal processor 360 produces and provides an image signal 55 to the click engine 260 for use in detecting click events. The image signal 55 can be generated based on the digital signal 355 representing the image or from sensor information obtained directly from the image sensor 140. Thus, although the image signal 55 is produced for a particular image, the image signal may not have a direct relationship to the digital signal 355 representing the image data itself In some embodiments, the signal processor 360 can be implemented within the sensor 140 itself The click engine 260 accesses a timer 230 to measure the time between finger lift-up and finger put-down motions and between sequential click events to determine whether a single click, a multiple click or no click has occurred. The click engine 260 further outputs click information 265 identifying the type of click (finger lift-up only, single click or multiple click) performed by the user.

In stylus mode, the mode switch 220 supplies the digital signal 355 to the navigation engine 370 to determine the navigation information 375 representing the direction and amount of movement. The navigation information 375 is provided to a stylus engine 390 to correlate the navigation information 375 with finger strokes used to identify letters, numbers, punctuation marks or other forms of written communication (hereinafter collectively referred to as characters). The navigation engine 370 can further interface with the click engine 260 to receive click information 265 indicative of when a finger lift-up motion has occurred and provide the click information 265 to the stylus engine 390 to indicate the completion of one character and the beginning of another character. The stylus engine 390 outputs character codes 395 that can be used by a host (or processor) to display the associated character to the user on a display associated with the electronic device incorporating the image acquisition device. For example, the display can be located on the electronic device, such as an LCD of a cell phone. As another example, the display can be located on a screen connected to a personal computer that is connected to a mouse having the image acquisition device therein. It should be understood that the navigation engine 370, fingerprint engine 380 and stylus engine 390 include the hardware, software and/or firmware required to perform the functions described above, and can be programmed using any type of programming technique, including object oriented programming.

In finger recognition mode, the mode switch 220 supplies the digital signal 355 to a fingerprint engine 380 to match the fingerprint to a previously stored fingerprint. If the sensing area of the image acquisition device is not sufficient to capture a complete image of the fingerprint within a single image, multiple images can be taken as the user moves their finger over the finger interface of the image acquisition device and the images can be stitched together to produce one complete image of the fingerprint. If stitching is required, to determine the amount of overlap between a current image and a previous image for stitching the images together, the mode switch 220 also supplies the digital signal 355 to the navigation engine 370 to determine the amount of movement (navigation information 375). The number of digital images required to form a complete digital image of the fingerprint varies depending on the sensing area, frame rate and speed of motion of the finger. However, the resulting complete digital image should be stitched to form a digital signal set that represents a 7 mm×12 mm or 9 mm×12 mm (depending on the size of the finger interface) total sensing area. Such a digital signal is necessary to obtain a sufficient number of minutiae (endings and bifurcations in the fingerprint) for fingerprint matching. The fingerprint engine 380 outputs fingerprint information 385, which can represent either a complete image of a fingerprint or the results of a fingerprint matching analysis.

The mode switch 220 can be toggled by a user depending on the application desired by the user and/or preset to toggle upon the completion of a task. For example, in one embodiment, the mode switch 220 can be initialized in finger recognition mode, and upon a positive fingerprint identification, automatically toggle to finger navigation mode or stylus mode. In further embodiments, the mode switch can be toggled using the click process described above.

Figure 8A:
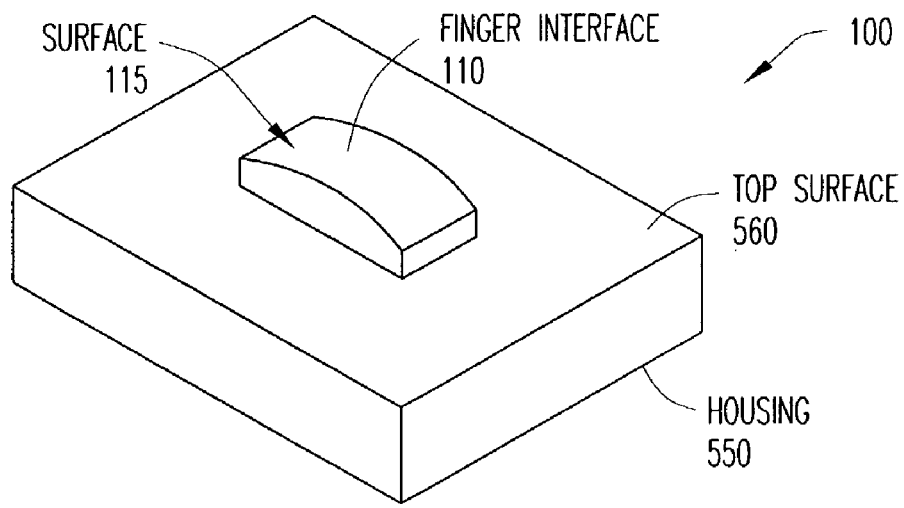
FIGS. 8A and 8B are top views of the image acquisition device package.
Figure 8B:
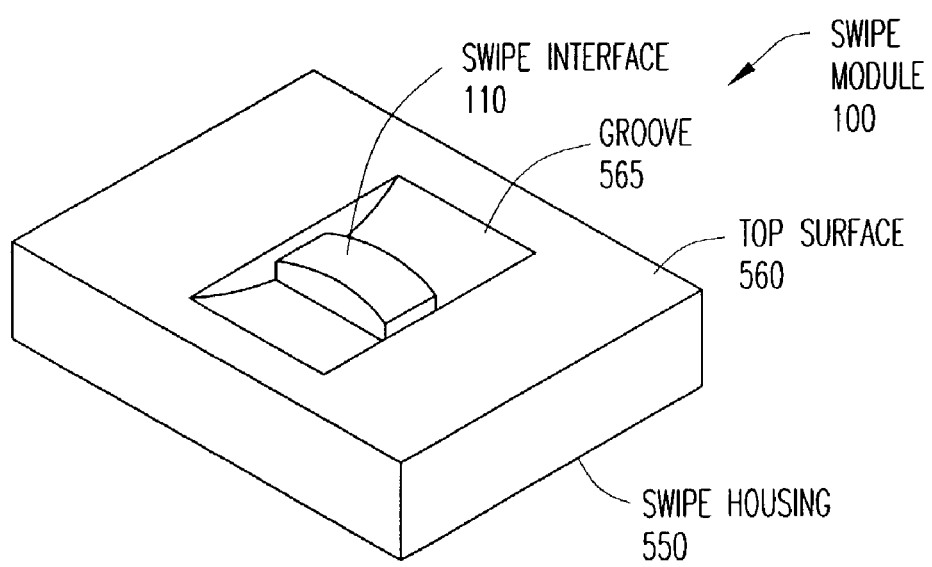

Two examples of package designs for the image acquisition device 100 are shown in FIGS. 8A and 8B. The image acquisition device 100 is shown for simplicity as being incorporated within a rectangular housing 550. However, it should be understood that other shapes and designs are possible. In addition, the top surface 560 of the housing 550 may form a part of a surface of an electronic device implementing the image acquisition device 100. The finger interface 110 protrudes above the top surface 560 of the housing 550 to provide a surface that is easy for a user to locate and feel. In addition, the finger interface 110 is shown having a convex surface 115 to enlarge the region of the finger that is in contact with the finger interface 110. FIG. 8B further illustrates a mechanically designed groove 565 in the top surface 560 of the housing 550 that directs the finger across the finger interface 110 in one non-rotating motion. Reducing rotation of the finger during finger navigation and finger recognition reduces processing complexity.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A method for detecting a finger click motion, comprising:
   receiving image signals associated with an image of a portion of a human finger within a sensing area of an optical sensor; and
   analyzing said image signals to determine whether said image signals are indicative of a finger click motion, wherein one of said image signals comprises a tracking quality signal measuring the tracking quality of the image as it relates to motion of the finger across said sensing area.

2. The method of claim 1, wherein said analyzing comprises:
   performing a comparison between one of said image signals and a previously received image signal to determine whether the difference between one of said image signals and said previously received image signal is indicative of a finger click motion.

3. The method of claim 1, wherein said analyzing comprises:
   performing a comparison between one of said image signals and a threshold value to determine whether one of said image signals is indicative of a finger click motion.

4. The method of claim 1, wherein said analyzing one of said image signals is performed to detect a finger lift-up motion indicating motion of the portion of the human finger away from the sensing area of the optical sensor.

5. The method of claim 1, wherein said analyzing one of said image signals is performed to detect a finger put-down motion indicating motion of the portion of the human finger towards the sensing area of the optical sensor.

6. The method of claim 1, further comprising:
   detecting a finger click motion based on one of said image signals; and
   repeating said receiving and said analyzing for at least one additional image until an additional finger click motion is detected.

7. The method of claim 6, wherein said detecting said finger click motion is performed to detect a finger lift-up motion indicating motion of the portion of the human finger away from the sensing area of the optical sensor and said repeating is performed to detect a finger put-down motion indicating motion of the portion of the tip of the human finger towards the sensing area of the optical sensor, and said method further comprises:
   detecting a single click event when detection of said finger lift-up motion is followed by detection of said finger put-down motion within a configurable time range.

8. The method of claim 7, wherein said detecting said single click event further comprises:
   determining a time difference between a time said finger lift-up motion is detected and a time said finger put-down motion is detected;
   detecting said single click event when said time difference is within said configurable time range.

9. The method of claim 7, further comprising:
   detecting a multiple click event including two or more single click events detected within a configurable multiple click time range.

10. The method of claim 1, wherein one of said image signals is a shutter speed signal specifying the shutter speed used to capture the image.

11. The method of claim 1, wherein one of said image signals is a unidirectionality signal measuring the correspondence between the image and a surface pattern indicator.

12. The method of claim 1, further comprising:
    processing image data representing a sequence of images resulting from motion of the portion of the human finger within the sensing area of the optical sensor in a selected mode of operation, said selected mode of operation being a finger navigation mode, a finger recognition mode or a stylus mode.

13. The method of claim 12, further comprising:
    providing click information associated with the detection of the finger click motion; and
    selecting said selected mode of operation using said click information.

14. The method of claim 13, wherein said processing further comprises:
    processing said image data using said click information.

15. An imaging system, comprising:
    a finger interface having a sensing area on a surface thereof against which at least a portion of a human finger may be placed;
    a light source for emitting light to illuminate the portion of the human finger placed against the surface of the finger interface;
    an optical image sensor for capturing light reflected from the portion of the human finger as an image thereof and producing image signals associated with the image for use in detecting a finger click motion; and
    an imaging processing system connected to at least said optical image sensor and configured to receive said image signals and analyze said image signals to determine whether one of said image signals is indicative of a finger click motion, wherein one of said image signals comprises a tracking quality signal measuring the tracking quality of the image as it relates to motion of the finger across said sensing area, said image processing system further computting click information indicating the detection of said finger click motion.

16. The imaging system of claim 15, wherein said image processing system is further configured to receive and analyze at least one additional image signal associated with at least one additional image to detect an additional finger click motion.

17. The imaging system of claim 16, wherein said image processing system is further configured to detect said finger click motion including a finger lift-up motion indicating motion of the portion of the human finger away from the sensing area of the optical sensor and detect said additional finger click motion including a finger put-down motion indicating motion of the portion of the tip of the human finger towards the sensing area of the optical sensor, and wherein said image processing system is further configured to detect a single click event when said detected finger lift-up motion is followed by said detected finger put-down motion within a configurable time range.

18. The imaging system of claim 17, wherein said image processing system further comprises:
a timer for measuring the time between the detection of said finger lift-up motion and detection of said finger put-down motion, said single click event being detected when said time measured by said timer is within said configurable time range.

19. The imaging system of claim 17, wherein said image processing system is further configured to detect a multiple click event including two or more single click events detected within a configurable multiple click time range.

20. The imaging system of claim 19, wherein said image processing system further comprises:
a timer configured to measure an elapsed time between consecutive detected single click events, said multiple click being detected when said elapsed time measured by said timer is within said configurable multiple click time range.

21. The imaging system of claim 15, wherein said image processing system is further configured to operate in a selected mode of operation, said selected mode of operation being a finger navigation mode, a finger recognition mode or a stylus mode.

22. The imaging system of claim 21, further comprising:
a mode switch for selecting said selected mode of operation using said click information.

23. The imaging system of claim 15, wherein said image processing system is further configured to process image data representing a sequence of images resulting from motion of the portion of the human finger within the sensing area of said optical sensor using said click information.

24. The imaging system of claim 15, wherein one of said image signals is a shutter speed signal specifying the shutter speed used to capture the image or a unidirectionality signal measuring the correspondence between the image and a surface pattern indicator.

25. An image system, comprising:
a finger interface having a sensing area on a surface thereof against which at least a portion of a human finger may be placed;
a light source for emitting light to illuminate micro texture features of at least a portion of the human finger placed against the surface of the finger interface;
a photo detector array for capturing light reflected from the portion of the human finger as an image representing said micro texture features, said photo detector array configured to provide at least one photo detector per image micro texture feature, said photo detector array producing image signals associated with the image for use in detecting a finger click motion; and
an imaging processing system connected to at least said photo detector array and configured to receive said image signals and analyze said image signals to determine whether one of said image signals is indicative of a finger click motion, wherein one of said inage signals comprises a tracking quality signal measuring the tracking quality of the image as it relates to motion of the finger across said sensing area, said image processing system further outputting click information indicating the detection of said finger click motion.

26. The imaging system of claim 25, wherein one of said image signals is a shutter speed signal specifying the shutter speed used to capture the image or a unidirectionality signal measuring the correspondence between the image and surface pattern indicator.

* * * * *

UNITED STATES PATENT AND TRADEMARK OFFICE
CERTIFICATE OF CORRECTION

| | | |
|---|---|---|
| PATENT NO. | : 7,313,255 B2 | Page 1 of 1 |
| APPLICATION NO. | : 10/440709 | |
| DATED | : December 25, 2007 | |
| INVENTOR(S) | : Akihiro Machida et al. | |

It is certified that error appears in the above-identified patent and that said Letters Patent is hereby corrected as shown below:

Title page, Column 1, item 56 (U.S. Patent Documents), Line 1, delete "346/166" and insert -- 345/166 --;

Column 14, Line 56, Claim 15, delete "computting" and insert -- outputting --;

Column 16, Line 6, Claim 25, delete "image" and insert -- imaging --;

Column 16, Line 26 (Approx.), Claim 25, delete "inage" and insert -- image --.

Signed and Sealed this

First Day of June, 2010

David J. Kappos
*Director of the United States Patent and Trademark Office*